United States Patent [19]
Wegner et al.

[11] 3,779,700
[45] Dec. 18, 1973

[54] EXHAUSTION DYEING OF SYNTHETIC FIBER MATERIALS WITH ANTHRAQUINONE DYESTUFFS AND WATER-IMMISCIBLE HALOGENATED ALIPHATIC HYDROCARBONS

[75] Inventors: Peter Wegner, Koeln; Rütger Neeff, Leverkusen; Volker Hederich; Günter Gehrke, both of Koeln, all of Germany

[73] Assignee: Bayer Aktiengesellschaft, Leverkusen, Germany

[22] Filed: July 30, 1970

[21] Appl. No.: 59,728

[30] Foreign Application Priority Data
Aug. 1, 1969 Germany.................. P 19 39 095.5

[52] U.S. Cl............................. 8/39, 8/25, 8/169, 8/166, 260/380
[51] Int. Cl............................................. D06p 1/20
[58] Field of Search .................... 8/25, 39; 260/380

[56] References Cited
UNITED STATES PATENTS

| | | | |
|---|---|---|---|
| 2,828,180 | 3/1958 | Sertorio | 8/62 |
| 3,530,150 | 9/1970 | Rickenbacher | 260/380 |
| 3,473,175 | 10/1969 | Sieber | 8/158 |
| 3,510,243 | 5/1970 | Sevret et al. | 8/39 |

FOREIGN PATENTS OR APPLICATIONS

| | | | |
|---|---|---|---|
| 1,045,839 | 10/1966 | Great Britain | |
| 1,359,458 | 3/1964 | France | 260/380 |
| 982,267 | 2/1965 | Great Britain | 260/380 |
| 832,343 | 1/1970 | Canada | |

OTHER PUBLICATIONS

Def. Publ. 647,220, pub. 11-9-68, 856 O.G. 669, Giles.
White, ADR, 7/31/67, p. 18-24 Wiegenink, Textile Research, 1940, V. 10, p. 357-371.

*Primary Examiner*—George F. Lesmes
*Assistant Examiner*—Patricia C. Ives
*Attorney*—Plumley & Tyner

[57] ABSTRACT

Exhaustion process for the dyeing of synthetic fibre materials from organic solvents, characterised in that anthraquinone dyestuffs containing hydroxyl groups, of formula

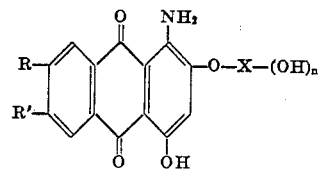

in which R and R' indepently of one another represent a hydrogen, fluorine or chlorine atom, X is a $C_2$-$C_6$-alkanepoly-yl radical and n is a number from 1 – 5, are used for the dyeing.

The dyestuffs are distinguished from the dyestuffs hitherto used for dyeing synthetic fibre materials from organic solvents by a significantly better affinity and an increased fastness to sublimation.

11 Claims, No Drawings

EXHAUSTION DYEING OF SYNTHETIC FIBER MATERIALS WITH ANTHRAQUINONE DYESTUFFS AND WATER-IMMISCIBLE HALOGENATED ALIPHATIC HYDROCARBONS

The subject of the invention is an exhaustion process for the dyeing of synthetic fibre materials from organic solvents; the process is characterised in that anthraquinone dyestuffs of formula

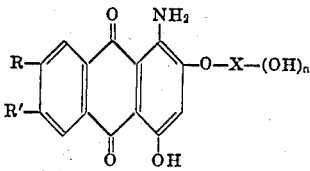

in which
R and R' independently of one another represent a fluorine, chlorine or preferably hydrogen atom,
X denotes a $C_2-C_6$-alkanepoly-yl radical, preferably a $C_2-C_5$-alkanepoly-yl radical, and
n is a number from 1 – 5, preferably a number from 1 – 3, are used for the dyeing.

Possible organic solvents for the process according to the invention are those solvents which are immiscible with water and of which the boiling points lie between 40° and 170° C, for example aromatic hydrocarbons, such as toluene or xylene and halogenated hydrocarbons, especially aliphatic chlorohydrocarbons, such as methylene chloride, chloroform, carbon tetrachloride, 1,1-dichlorethane, 1,2-dichlorethane, 1,1,2-trichlorethane, 1,1,1,2-tetrachlorethane, 1,1,2,2-tetrachlorethane, pentachlorethane, 1-chloropropane, 2-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methylpropane, as well as aliphatic fluoro- or fluoro-chloro-hydrocarbons, such as perfluoro-n-hexane, 1,2,2-trifluoro-trichlorethane and 1,1,1-trifluoropentachloropropane, and aromatic chloro- and fluoro-hydrocarbons, such as chlorobenzene, fluorobenzene, chlorotoluene and benzotrifluoride. Tetrachlorethylene, trichlorethylene and 1,1,1-trichlorethane have proved particularly suitable. Mixtures of these solvents can also be used.

It has frequently proved advantageous if the dyeing liquors contain small amounts, that is to say up to 1 per cent by weight, preferably 0.5 per cent by weight, of water relative to the weight of the organic solvents.

Furthermore, an addition of non-ionic auxiliary agents to the dyeing liquors has proved advantageous in some cases. Possible non-ionic auxiliary agents are especially the known surface-active oxyethylation and propoxylation products of fatty alcohols, alkylphenols, fatty acid amides and fatty acids as well as their mixtures; the auxiliary agents are employed in an amount of 0.05 – 2 per cent by weight relative to the weight of the organic solvents. Instead of adding the auxiliary agents directly to the dyeing liquors, they can advantageously also be used for working the dyestuffs into a dough and can in this way be added to the dyeing liquors in the form of a dyestuff-auxiliary agent dough.

The synthetic fibre materials to be dyed according to the invention are above all fibre materials of polyesters, for example polyethylene terephthalate or polycyclohexane-dimethylene-terephthalate, of cellulose triacetate, cellulose 2½-acetate, polyacrylonitrile, synthetic polyamides, such as hexamethylenediamine adipate, poly-ε-caprolactam or ω-amino-undecane-acid and polyurethanes. The fibre materials can be in the most diverse processing stages, for example filaments, flock, tops, yarn, piece goods, such as woven fabrics or knitted fabrics, or made-up goods.

The dyeing according to the invention is preferably carried out in closed apparatuses, for example by introducing the fibre materials into the dyebath at room temperature, heating the dyebath to 60° – 170° C and keeping it at this temperature until the liquor is exhausted; this is generally the case after 10 – 60 minutes. After cooling to room temperature the liquor is separated off and the fibre materials are, optionally after a brief rinsing with fresh organic solvent, freed of the adhering solvent by suction-treatment or centrifuging and subsequent drying in a warm stream of air. With the aid of the process according to the invention it is possible to dye synthetic fibre materials in a similar manner from organic solvents to give high dyestuff yields and excellent fastness properties.

The dyestuffs used according to the invention for dyeing from organic solvents are obtained according to processes which are in themselves known, for example by reaction of 1-amino-4-hydroxy-anthraquinones, which carry a replaceable substitute in the 2-position, such as chlorine or bromine, lower alkoxy radicals, sulphonic acid groups or preferably aryloxy radicals, with polyhydric aliphatic alcohols which contain at least 2 and at most 6 hydroxyl groups and of which the alkanepoly-yl radical consists of 2 – 6 carbon atoms in the presence of inorganic or organic bases, optionally in inert organic solvents, such as sulpholane, N-methylpyrrolidone or pyridine, at temperatures between 80° and 160° C.

The dyestuffs to be used according to the invention are largely insoluble in the organic solvents which are immiscible with water. They are distinguished from the dyestuffs hitherto used for dyeing synthetic fibre materials from organic solvents by a significantly better affinity and increased fastness to sublimation. A further advantage of the process according to the invention consists of the fact that the depth of colour of the resulting dyeings is, for a given dyestuff: goods to by dyed ratio, largely independent of the concentration of the dyestuff in the dyeing liquor and hence also independent of the liquor ratio. Because of this independence of the liquor ratio employed, the process according to the invention can be carried out in all known dyeing devices, such as winch dyers, jiggers and the like, which are known each to work with a different liquor ratio, and yields reproducible dyeings.

It should be pointed out that mixtures of the dyestuffs to be used according to the invention at times give a better dyeing yield than the individual dyestuffs.

The parts indicated in the Examples which follow are parts by weight.

EXAMPLE 1

100 parts of a woven fabric of textured polyethylene terephthalate fibres are introduced at room temperature, without prior cleaning, into a dyebath which is prepared from 1 part of 1-amino-2-(2,2-bis-hydroxymethyl - 3 - hydroxypropoxy) - 4 - hydroxy - anthraquinone and 1,000 parts of tetrachlorethylene. The bath is heated to 115° C over the course of 10 minutes with vigorous circulation of the liquor and is kept at this temperature for 30 minutes. The liquor is then separated off and the goods being dyed are rinsed with fresh solvent for 5 minutes at about 40° C. After separating off the rinsing liquor, the goods being dyed are centrifuged and dried in a stream of air. A strong red dyeing with excellent fasteness to sublimation as well as very good fastness to washing and light is obtained.

An equivalent red dyeing was obtained in the same manner on a woven fabric of polycyclohexane-dimethylene-terephthalate fibres.

If the tetrachlorethylene is replaced by the same amount of 1,1,2-trichlorethane, an equivalent dyeing is obtained.

The dyestuff used had been manufactured as follows:

100 parts of 2,2-bis-hydroxymethyl-propanediol-(1,3) were dissolved in 100 parts of sulpholane. 5 parts of potassium hydroxide and 17 parts of 1-amino-2-phenoxy-4-hydroxy-anthraquinone were introduced into the solution. Thereafter the reaction mixture was warmed to 120° C until the starting material was no longer chromatographically detectable. Thereafter the reaction mixture was diluted with water and slightly acidified with dilute hydrochloric acid. The precipitate was filtered off and washed with water until neutral. After drying, 15.3 parts of the dyestuff indicated above were obtained.

EXAMPLE 2

100 parts of a woven fabric of triacetate fibres are introduced at room temperature into a dyebath which is prepared from 1 part of 1-amino-2-(2-hydroxymethyl-2-ethyl-3-hydroxy-propoxy)-4-hydroxy-anthraquinone and 1,000 parts of tetrachlor-ethylene. The bath is heated to 110° C over the course of 20 minuted with vigorous circulation of the liquor and is kept at this temperature for 45 minutes. The liquor is then separated off and the woven fabric is rinsed with fresh tetrachlor-ethylene at 40° C. After separating off the rinsing liquor, the goods being dyed are freed of adhering solvent by centrifuging and drying in a stream of air. A full, brilliant red dyeing of excellent fasteness properties is obtained.

If the 1,000 parts of tetrachlorethylene were replaced by the same amount of 1,1,2-trichlorethane, 1,1,1,2-tetrachlorethane, 1,1,2,2-tetrachlorethane, pentachlor-ethane, 1,2-dichloropropane, 2-chlorobutane, 1,4-dichlorobutane, chlorobenzene or chlorotoluene, equivalent red dyeings were obtained.

The dyestuff used had been obtained as described in Example 1 except that instead of the 100 parts of 2,2-bishydroxymethyl-propanediol-(1,3) the equivalent amount of 1,1,1-tris-hydroxymethyl-propane was used and the solvent sulpholane was dispensed with.

EXAMPLE 3

100 parts of yarn of acetate filaments are introduced at about 22° C into a dyebath which is prepared from 1 part of the dyestuff used in Example 1, 1,000 parts of tetrachlorethylene, 1.5 parts of oleic acid ethanolamide, 1.5 parts of oleyl alcohol heptaglycol ether and 6 parts of water. The bath is warmed to 78° C over the course of 20 minutes and kept at this temperature for 45 minutes. After separating off the dyeing liquor and rinsing with fresh tetrachlorethylene, the goods being dyed are freed of the adhering solvent by suction-treatment and drying in a stream of air. A brilliant red dyeing is obtained.

EXAMPLE 4

100 parts of polyacrylonitrile fibre yarn are dyed in a bath which is prepared as described in Example 3. The bath is warmed to 100° C over the course of 20 minutes and kept at this temperature for 30 minutes. After the usual washing and drying, a red dyeing of good fastness properties is obtained.

EXAMPLE 5

100 parts of fibre yarn of poly-ε-caprolactam are introduced at room temperature into a dyebath which contains 1 part of 1-amino-2-(2-hydroxymethyl-2-methyl-3-hydroxy-propoxy)-4-hydroxy-anthraquinone in 1,000 parts of tetrachlorethylene. The bath is warmed to 100° C over the course of 20 minutes with vigorous circulation of the liquor and is kept at this temperature for 40 minutes. After this time the liquor is separated off, the goods are briefly rinsed with fresh solvent, and after centrifuging the dyeing is dried in a stream of air. A brilliant red dyeing having good fastness properties is obtained.

An equivalent dyeing was also obtained on yarns of polyhexamethylenediamine adipate fibres.

The colour strength of the dyeing can be increased by adding 1 part of oleic acid ethanolamide, 1 part of oleyl alcohol heptaglycol ether and 4 parts of water to the dyebath.

If, instead of the dyestuff mentioned, the same amount of one of the dyestuffs quoted in the Table below was employed, red dyeings with equivalent fastness properties were obtained on woven fabrics of polyester, triacetate, polyamide, cellulose 2½-acetate, polyacrylonitrile or polyurethane fibres:

| Example | Dyestuff |
|---|---|
| 6 | 1-Amino-2-(2,3-dihydroxy-propoxy)-4-hydroxy-anthraquinone |
| 7 | 1-Amino-2-(2-hydroxy-propoxy)-4-hydroxy-anthraquinone |
| 8 | 1-Amino-2-(3,4-dihydroxy-butoxy)-4-hydroxy-anthraquinone |
| 9 | 1-Amino-2-(3-hydroxy-propoxy)-4-hydroxy-anthraquinone |
| 10 | 1-Amino-2-(2,4-dihydroxy-butoxy)-4-hydroxy-anthraquinone |
| 11 | 1-Amino-2-(2-hydroxy-ethoxy)-4-hydroxy-anthraquinone |
| 12 | 1-Amino-2-(4,5-dihydroxy-hexoxy)-4-hydroxy-anthraquinone |
| 13 | 1-Amino-2-(2,6-dihydroxy-hexoxy)-4-hydroxy-anthraquinone |
| 14 | 1-Amino-2-(2,4-dihydroxy-pentoxy)-4-hydroxy-anthraquinone |
| 15 | 1-Amino-2-(2,3,4-trihydroxy-butoxy)-4-hydroxy-anthraquinone |
| 16 | 1-Amino-2-(2,3,4,5-tetrahydroxy-pentoxy)-4-hydroxy-anthraquinone |
| 17 | 1-Amino-2-(2,3,4,5,6-pentahydroxy-hexoxy)-4-hydroxy-anthraquinone |
| 18 | 1-Amino-2-(2,2-bis-hydroxymethyl-3-hydroxy-propoxy)-4-hydroxy-6-chlor-anthraquinone |
| 19 | 1-Amino-2-(2-hydroxymethyl-2-methyl-3-hydroxy-propoxy)-4-hydroxy-7-chlor-anthraquinone |
| 20 | 1-Amino-2-(2-hydroxymethyl-2-ethyl-3-hydroxy-propoxy)-4-hydroxy-6-fluor-anthraquinone |
| 21 | 1-Amino-2-(2,2-bis-hydroxymethyl-3-hydroxy-propoxy)-4-hydroxy-7-fluor-anthraquinone |
| 22 | 1-Amino-2-(2-hydroxy-ethoxy)-4-hydroxy-6,7-dichlor-anthraquinone |
| 23 | 1-Amino-2-(2-hydroxy-ethoxy)-4-hydroxy-6,7-difluor-anthraquinone |

EXAMPLE 24

50 parts of polyethylene terephthalate filaments are introduced into a dyebath which is prepared from 0.5 part of the dyestuff used in Example 2 and 0.5 part of the dyestuff used in Example 5, 1.5 parts of oleic acid ethanolamide, 1.5 parts of oleyl alcohol heptaglycol ether, 6 parts of water and 500 parts of tetrachlorethylene. The bath is heated to 120° C over the course of 10 minutes with vigorous circulation of the liquor and is kept at this temperature for 45 minutes. After separating off the dyeing liquor, the goods being dyed are rinsed with fresh solvent at 40° C and are dried in a stream of air after removing the rinsing liquor. A deep red dyeing having excellent fastness to light and sublimation is obtained.

EXAMPLE 25

100 parts of polyethylene terephthalate woven fabric are dyed for 30 minutes at 115° C in a dyebath of 1 part of the dyestuff manufactured by reaction of 1-amino-2-phenoxy-4- hydroxy-anthraquinone with glycerine in the manner indicated below, 3 parts of oleic acid ethanolamide, 3 parts of oleyl alcohol heptaglycol ether, 12 parts of water and 1,600 parts of tetrachlorethylene. After rinsing with fresh tetrachlorethylene and drying, a strong red dyeing with very good fastness to sublimation, washing and light is obtained.

The dyestuff used had been manufactured in the following manner:

100 parts of glycerine were mixed with 5 parts of potassium hydroxide. 17 parts of 1-amino-2-phenoxy-4-hydroxy-anthraquinone were introduced into the mixture at 100° C under nitrogen. The reaction mixture was subsequently warmed to 115° C until the starting material was chromatographically no longer detectable, diluted with water and slightly acidified with dilute hydrochloric acid. The precipitate was filtered off and washed with water until neutral. After drying at 40° C, 14.1 parts of the abovementioned dyestuff were obtained.

EXAMPLE 26

100 parts of a woven fabric of textured polyethylene terephthalate fibres are introduced at room temperature, without prior cleaning, into a dyebath which is prepared from 1 part of the dyestuff mixture manufactured by reaction of 1-amino-2-phenoxy-4-hydroxy-anthraquinone with butanetriol-1,2,4 in the manner indicated below and 1,000 parts of tetrachlorethylene, and are dyed for 30 minutes at 115° C. After the usual rinsing and drying, a red dyeing with very good fastness to sublimation, washing and light is obtained.

The dyestuff mixture used had been obtained as described in Example 25, except that instead of the 100 parts of glycerine the equivalent amount of 1,2,4-butanetriol was used.

EXAMPLE 27

100 parts of a woven fabric of triacetate fibres are introduced at room temperature into a dyebath which contains 1 part of the dyestuff mixture manufactured by reaction of 1-amino-2-phenoxy-4-hydroxy-anthraquinone with hexanetriol-1,2,6 in the manner indicated below, in 1,000 parts of tetrachlorethylene. The bath is warmed to 100° C over the course of 20 minutes with vigorous circulation of the liquor and is kept at this temperature for 40 minutes. After separating off the dyeing liquor, the goods being dyed are briefly rinsed with fresh solvent and are dried in a stream of air after centrifuging off the washing liquor. A brilliant red dyeing having good fastness properties is obtained.

The dyestuff mixture used had been obtained as described in Example 25, except that instead of the 100 parts of glycerine the equivalent amount of 1,2,6-hexanetriol was used.

EXAMPLE 28

100 parts of a woven fabric of anionically modified polyethylene terephthalate (Dacron 64) are dyed for 30 minutes at 115° C in a dyebath of 1 part of the dyestuff described in Example 1, 3 parts of oleic acid ethanolamide, 3 parts of oleyl alcohol heptaglycol ether, 12 parts of water and 1,600 parts of tetrachlorethylene. After rinsing with fresh tetrachlorethylene and drying, a strong red dyeing having very good fastness to sublimation, washing and light is obtained.

An equivalent red dyeing was also obtained on a woven fabric of anionically modified polyhexamethylenediamine adipate (Nylon T 844).

We claim:

1. A process for dyeing synthetic fiber materials comprising the steps of
   1. introducing the synthetic fiber material into a dyebath consisting essentially of organic solvent, up to 1 percent by weight of water based on said organic solvent and dispersed therein an anthraquinone dyestuff largely insoluble in the organic solvent and having the formula

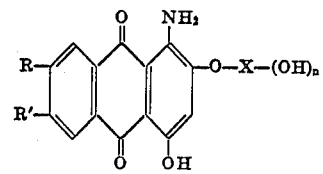

in which R and R' independently of one another are hydrogen, fluorine or chlorine;

X is a $C_2$-$C_6$-alkanepoly-yl radical; and n is a number from 2–3;

said organic solvent consisting of water-immiscible halogenated aliphatic hydrocarbon boiling between 40° and 170° C; and 2. keeping said synthetic fiber material in said dyebath at a temperature of 60°–170° C until the dyebath is exhausted.

2. The process of claim 1 in which said synthetic fiber material is polyester.

3. The process of claim 11 in which the dyestuff has the formula

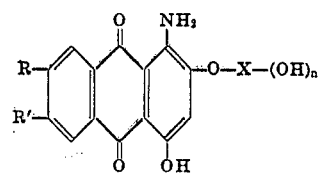

in which R and R' are hydrogen.

4. The process of claim 1 in which the dyestuff has the formula

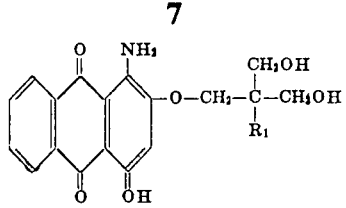

in which $R_1$ is a methyl, hydroxymethyl or ethyl.

5. The process of claim 1 in which the dyestuff is 1-amino-2-(2,2-bis-hydroxymethyl-3-hydroxy-propoxy)-4-hydroxy-anthraquinone.

6. The process of claim 1 in which the dyestuff is 1-amino-2-(2-hydroxymethyl-2-methyl-3-hydroxy-propoxy)-4-hydroxy-anthraquinone.

7. The process of claim 1 in which the dyestuff is 1-amino-2-(2-ethyl-2-hydroxymethyl-3-hydroxy-propoxy)4-hydroxy-anthraquinone.

8. The process of claim 1 in which the dyestuff has the formula

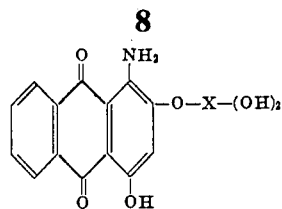

in which X has the same meaning as in Claim 1.

9. The process of claim 1 in which the dyestuff 1-amino - 2 - (2,3 - dihydroxy - propoxy) - 4 - hydroxy - anthraquinone.

10. The process of claim 1 in which the dyestuff is 1-amino - 2 - (dihydroxy - butoxy) - 4 - hydroxy - anthraquinone.

11. The process of claim 1 in which the dyed synthetic fiber material is subsequently rinsed with fresh water immiscible organic solvent.

* * * * *